United States Patent [19]

Peil et al.

[11] 4,339,040

[45] Jul. 13, 1982

[54] FORK LIFT PALLET CONSTRUCTION

[75] Inventors: Charles A. Peil, Midland; John W. McLaren, Beaverton, both of Mich.

[73] Assignee: The Dow Chemical Company, Midland, Mich.

[21] Appl. No.: 104,209

[22] Filed: Dec. 17, 1979

Related U.S. Application Data

[63] Continuation of Ser. No. 904,836, May 11, 1978, abandoned.

[51] Int. Cl.³ .................................................. B65D 19/00
[52] U.S. Cl. ..................................... 206/599; 206/597;
206/497; 108/51.1; 108/55.1
[58] Field of Search .................... 206/597, 599, 497;
108/53.1, 55.1, 51.1, 53.3, 54.1, 55.5

[56] References Cited

U.S. PATENT DOCUMENTS

| 3,526,195 | 9/1970 | Maryonovich | 108/53.1 |
| 3,944,070 | 3/1976 | Cardwell et al. | 108/53.1 |
| 3,948,190 | 4/1976 | Cook et al. | 108/55.3 |
| 4,000,704 | 1/1977 | Griffin et al. | 206/511 |

FOREIGN PATENT DOCUMENTS

| 954806 | 9/1974 | Canada | 206/599 |
| 1277133 | 9/1968 | Fed. Rep. of Germany | 108/55 A |
| 2254724 | 9/1973 | Fed. Rep. of Germany | 206/597 |
| 828506 | 2/1960 | United Kingdom | 108/53.1 |
| 127185 | 6/1960 | U.S.S.R. | 108/53 A |

OTHER PUBLICATIONS

Production Engineering Magazine 11-1974 "Some Straight Talk About Plastic Pallets" pp. 70-73.

Primary Examiner—Joseph Man-Fu Moy

[57] ABSTRACT

The invention relates to a fork lift pallet characterized by a raised platform construction, and having suitability of purpose to support and permit unitized handling of at least 300 times its own weight. The features of the pallet that lend to its extended utility over the prior art include the use of densely packed column means, arranged in a strategic pattern, and supporting the raised platform critically between about ¾" to 2". Essentially, the entire platform surface is columnized as above-described, except for parallel non-column supported spans (two or four in number) for fork lift access and retrieval. The pallet further features a stepped sidewall with a rolled extreme edge for maximum stiffness and multiple elongated ribs in the platform, set out of phase to provide optimum utility traits. Unitized product loads may be moved on such pallets in a manner closely simulating the functionality of prior heavy rigid pallets of wood or plastic.

8 Claims, 12 Drawing Figures

FORK LIFT PALLET CONSTRUCTION

This is a continuation, of application Ser. No. 904,836, filed May 11, 1978 now abandoned.

FIELD OF THE INVENTION

The invention relates to an improved fork lift pallet for industrial use in conjunction with shipping and handling of unitized loads of between about 500 to 3500 lbs. More particularly, the invention relates to an improved especially lightweight pallet that may be prepared from reprocessed or off grade thermoplastics, and that achieves an especially surprising pallet/load weight ratio in conjunction with a raised platform design. The load is supported in raised position thus simulating the utility of much heavier and more costly pallet structures.

BACKGROUND OF THE INVENTION

Lightweight pallets are rarely, if ever used in industrial commerce except in forms requiring substantial departures from the predominant fork lift mode of handling. Consequently lightweight pallets, in forms known prior to the invention, except as specified below, are oftentimes distinguished as slip sheets rather than true pallets. These designs typically embody one or more plastic or corrugated paper sheets that are almost always planar in design. Examples of such pallets or slip sheets are exemplified, for example, in U.S. Pat. Nos. 2,328,397, 3,776,145, and 3,790,010 and French Pat. No. 2,094,046.

The disadvantages of such designs are, of course, apparent and well recognized since modified fitting mechanisms, and fork lift attachments are required for utility.

Progress toward an improved lightweight pallet simulating more closely the utility of heavy duty pallets, such as of wood is described in U.S. Pat. application Ser. No. 684,046, filed May 7, 1976, by E. L. Greenawalt. The principle taught in the Greenawalt design is based on the construction of a lightweight tray that is unitized with the load through a film or equivalent wrapping. The combination of the lightweight tray and a proper film wrapping has been discovered to have surprising bottom fork lift capability.

The present invention is a further improvement on the Greenawalt type of pallet structure, designed to give properties closely simulating a true rigid pallet, but formed of lightweight relatively inexpensive materials, such as by rapid sheet thermoforming techniques.

The invention is particularly the discovery, and disclosure of the feasibility of an especially lightweight, sheet thermoformed pallet embodying the highly distinguishing feature of a raised platform, in conjunction with open spaces underneath the platform for insertion and retrieval of a conventional lifting fork mechanism. For example, a lightweight thermoplastic sheet of between 50–80 mils thickness may be thermoformed to the pallet design disclosed below and used with loads up to 2500 pounds. Such pallets may be used even in conjunction with the difficult case of palletized bags, and stacked several pallets high, while maintaining suitable utility for moving and relocating the stacked pallet loads. Hence, the weight supported suitably on the lowest pallet of the invention is an amazing 5000 lbs.

The preferred but not required mode of use of the inventive pallet enlists the use of traditional pallets (heavy duty), on which the pallets of this invention are supported for warehouse functions. The inventive pallets, however, are beneficially used solely in the shipment mode. Thus, for unloading and loading a boxcar or truck, the pallets may be used in the fork lift mode closely simulating the functionality of a heavy wooden or other comparable warehouse pallet. Since the warehouse pallets as may be used in conjunction with the lightweight pallets of the present invention are thus desirably limited to warehouse activities, but a limited number are required. Further, since the heavy pallets are not shipped, in addition to direct savings that are available from the inexpensive design of the pallets of this invention, significant weight reductions and space savings are also available to minimize shipping costs, and to maximize the amount of product shipped in the limited boxcar or truck trailer space.

The design features of the improved pallet, that contribute together to provide the utility described, include (a) a densely columnized raised platform, essentially the entire surface area of the platform, excepting the forked entry areas, bearing columns of critical sizing, height, and spacing patterns, (b) a stepped sidewall terminating in a rolled edge, (c) non-columnized spans for fork entry and retrieval that define balanced fork entry points, and (d) elongated ribs in the platform, out of phase, and cooperating with the column design and sidewall design to impart optimum utility traits to the pallet.

The pallet of the invention may also be designed to size itself to the lower geometry of the unitized load, without sacrificing the above properties. For these applications, the corner sections of the sidewall are trimmed away, creased, pleated, or otherwise suitably modified to permit inward load sizing movement of the sidewall. A critical radius is additionally designed at the base of the sidewall, permitting it to bend inwardly and flushly contact the base of the product load. The foregoing design is particularly useful for boxed, or unitized rectangular goods, rather than industrial bags, which tend to be self sizing, and thus have a lesser need for this latter feature.

In all cases referred to above, the pallet is designed for use in combination with a unitizing wrap, or wrap means, most frequently a stretch or shrink film overwrap, netting, or banding, which joins the load to the pallet. It is this feature with the described improved design features embodied in the pallet, which achieves the closely simulated utility characteristic vis-a-vis wooden and other heavy pallet structures. Since the latter typically have a pallet/load weight ratio of as little as 40–60, the advantages of the invention are thus readily apparent. Aside from the obvious weight savings and cost advantages, there are, of course, major savings permitted in the compact shipping of the inventive pallets in nested stacks, the washability of plastic as opposed to wood, the imperforate tray structure with optional imbiber bead fill to soak up and retain spillage, and the fact that the pallets of the invention may be economically reduced to scrap and reprocessed. Thus, collection and return of the inventive pallets (while feasible because of the nesting capability of the pallets) is not demanded by the economics.

The invention is further disclosed in a more detailed form by reference to the attached drawing wherein.

DETAILED DESCRIPTION OF THE INVENTION

Figure 1:
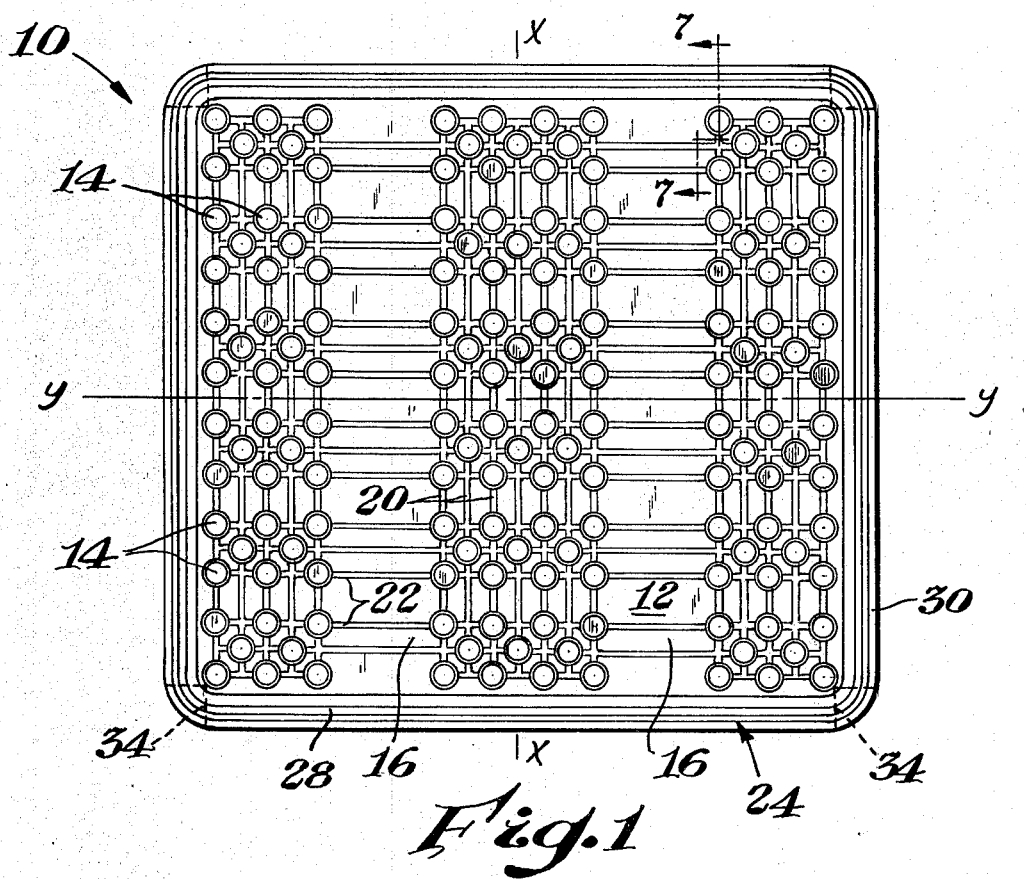
FIG. 1 is a top plan view of a preferred pallet design constructed according to the principles of this invention.
Figure 2:
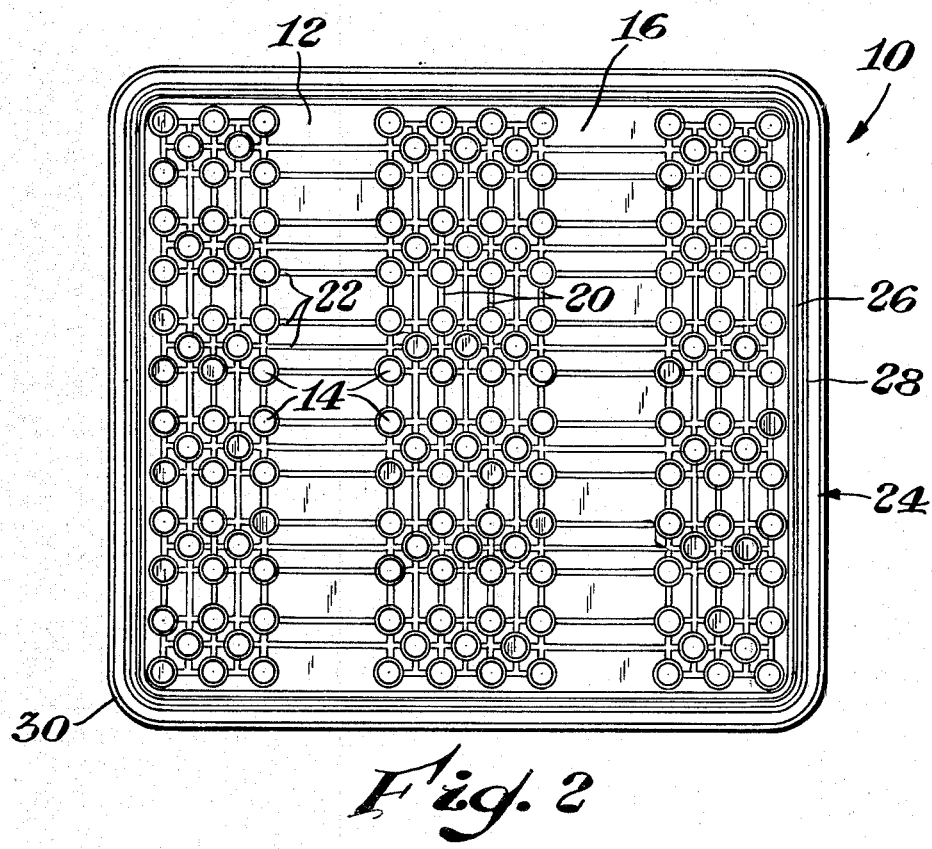
FIG. 2 is a bottom plan view of the pallet of FIG. 1.

The pallet shown in FIG. 1, generally by reference numeral 10, is prepared from synthetic resinous thermoplastic sheet material of between about 30 to about 120 mils average sheet thickness, and most preferably about 30 to 80 mils. As such, the pallet weight is between about $2\frac{1}{4}$ to 9 lbs, and most preferably, between about $2\frac{1}{4}$ to 6 lbs. Generally, for a load of about 1000 lbs, a sheet of about 30-45 mils is usually suitable. Such pallets are designed for at least double stacking. Thus, the pallet for this specific load size must withstand a column load force of 2000 lbs. For pickup, moving, and setting down other than pure column loading forces, of course, must be accepted by the pallet, and overwrap combination disclosed below.

The specific and enabling design features of pallet 10 include a raised generally rectangular platform or flexible sheet 12, which typically will represent the original plane of the sheet from which the pallet is prepared. Essentially the entire surface area of platform 12 is columnized. Hence, densely packed individually small columns or column means 14, each an imperforate cone shape and tapered downwardly, are employed to define the desired raised platform feature. The columns 14 collectively comprise a rigid base in the vertical direction which supports platform 10.

Figure 4:
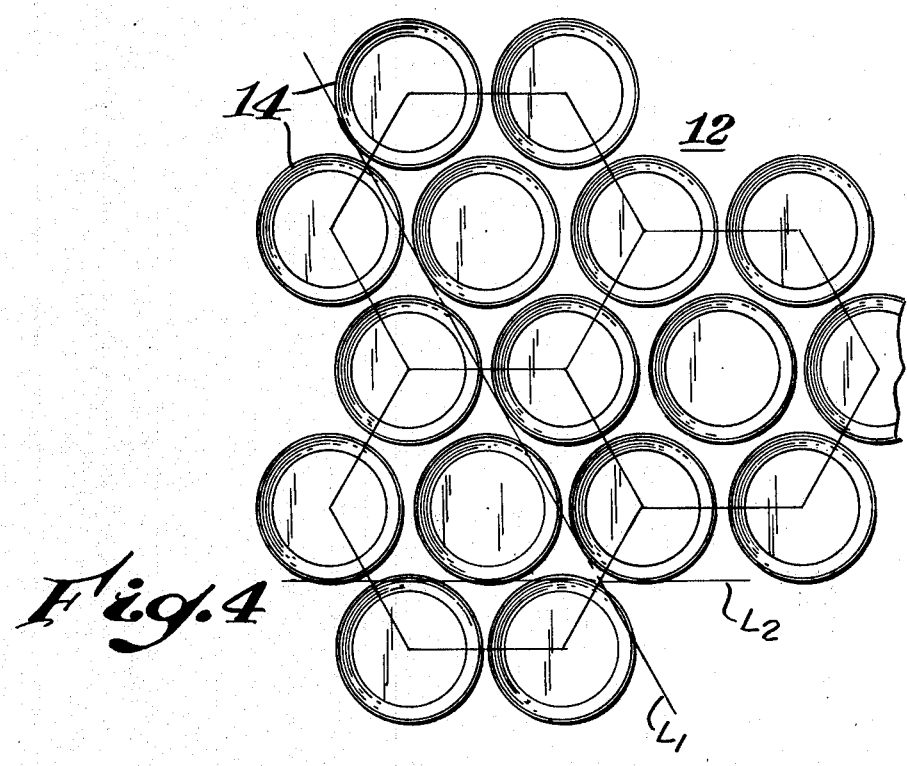
FIG. 4 illustrates preferred column spatial patterns (deleting other detail)

The columns are of critical design and spacing. Most ideally, the column spatial arrangement is set to define a center faced, hexagonal pattern as shown in FIG. 4. This pattern or other appropriate patterns which characterize the distinguishing pallet structure of the invention require that no straight lines (imaginary) may be drawn between adjacent rows of columns 14 without intersecting columns in both rows. To illustrate this, imaginary straight lines L1 and L2 are shown in the FIG. 4 view. Since the column means are staggered and closely bunched, it is thus apparent that lines L1 and L2, or any straight lines, may be drawn between adjacent column rows (on the plane of platform 12), without intersecting columns in both rows.

The generic pattern of which center faced, hexagonal is the most desirable species, thus requires columns set out in staggered rows, and with sufficiently close spacing so that no drawable straight lines, in the mode supra exist between such rows, as mentioned. Other known patterns or column spatial arrangements that exemplify this design feature may be beneficially utilized in constructing pallets 10.

The shape of the columns requires a taper from the plane of the raised platform, but is not limited to the cone shape illustrated. For example, modified columns of 3-7 point star shape may be utilized. Similarly, with respect to FIG. 5, the following column forms of octagonal 14a, fluted 14b, and hexagonal 14c, are considered advantageously incorporated in the pallet design of this invention. Other than a non-preferred square shape or other similar non-preferred shapes that present 90° corners, the column configuration may thus assume a wide number of generally quite comparable forms.

Figure 5:
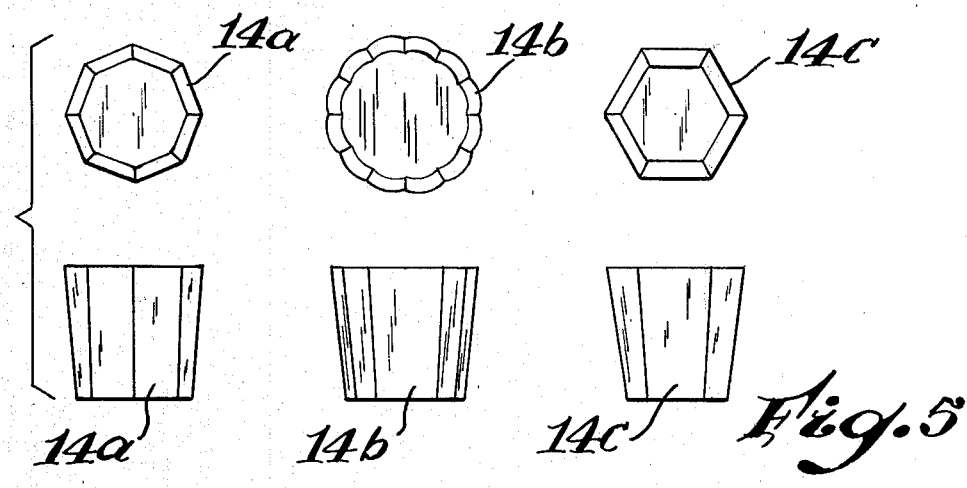
FIG. 5 shows modified column geometry.

The critical aspects of the column 14 structure require a height (alternatively viewed as depth) dimension "h" in FIG. 5, in the range between about $\frac{3}{4}$" to 2", and most preferably between the even narrower range of about $1\frac{1}{4}$" to $1\frac{3}{4}$". In conjunction, the column density and average column cross-sectional area is critically specified. Cross-sectional area, with the numbers used herein, means the cross-section of the column at the midpoint in its height or plane $\frac{1}{2}$" h (as shown by dotted lines in FIG. 7, and as calculated using the column O.D. dimension). Average cross-sectional area of the columns is about 2.0 square inches or less, and most preferably about 1.7 square inches or less. In addition, column density, excluding the area of sidewall 12, is between about 10-40 columns per square foot of platform 12, and about 15-25 columns per square foot of platform is most preferred.

Figure 3:
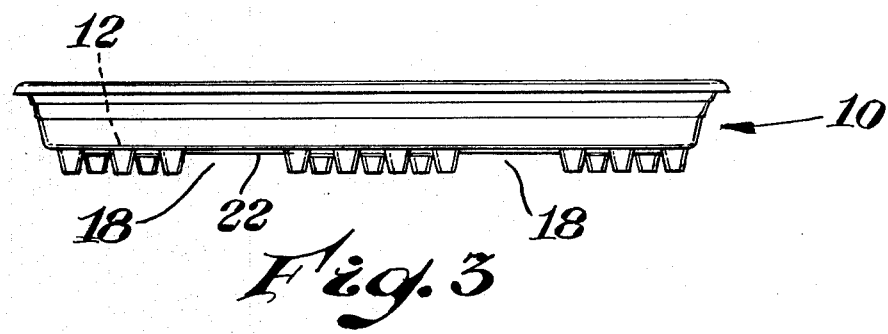
FIG. 3 shows a side elevational view thereof.

The non-column or non-ground supported spans or flexible sheet portions, given reference numeral 16, are defined in pairs centered on the imaginary x and y axis (arbitrarily designated) of the platform. Such extend across the length and width of the platform thus defining opening spaces 18 underneath platform 12. As is apparent by the location of the non-supported spans, the same are positioned for balanced lifting of the loaded pallet. As illustrated by the side view of FIG. 3, the entry points may be easily identified by the fork lift operator.

Two pairs of spans 16 will be used, as shown, to construct a pallet 10 capable of 4-way entry (see FIG. 11) and one pair of spans would be necessary for a 2-way pallet, as contemplated in FIG. 1.

Further structure in the platform is the provision of platform stiffening means, preferably hollow elongated ribs or rib means 20, laterally spaced and aligned with the x-axis, and similar ribs 22 aligned with the y-axis. These ribs may be downwardly formed as shown in the cross-sectional view of FIG. 7, or upwardly formed from the plane of the sheet as shown by the dotted line 22 in the same Figure. Most preferably, the elongated ribs are centered on the axis of the aligned column means in each row as illustrated, and 90° out of phase. The rib design and position may desirably assume known modified designs of which a grid pattern of numerous rib increments of varied phase angles would be considered a suitable design and rib placement species.

Figure 6:
FIGS. 6-7 are cross-sectional views taken along reference lines y—y and 7—7, respectively, of FIG. 1.

The sidewall construction, element 24 in the drawing, is also critical in conjunction with the raised platform design of the pallet. In this respect, the sidewall is stepped at 26 and 28 (either locally or continuously) as shown best in FIGS. 3, 6 and 7. Importantly, also the top edge 30 of the sidewall is rolled or turned to a partial or complete curl as shown. The curl is desirably outwardly as shown in the preferred form of the invention. Reinforcing ribs (such as like that described with regard to platform 12 below) may be substituted for steps 26, 28, but would be less preferred. Sidewall height "b" is between 2 and 10 inches, in order to protect the vulnerable base of the palletized load.

Figure 8:
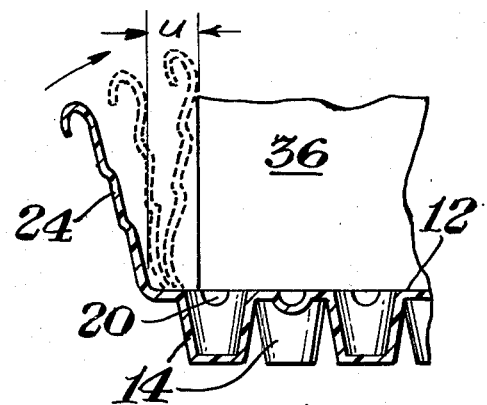
FIGS. 8-10 are partial cross-sectional views illustrating the pallet selfsizing feature possible with the inventive design.
Figure 9:
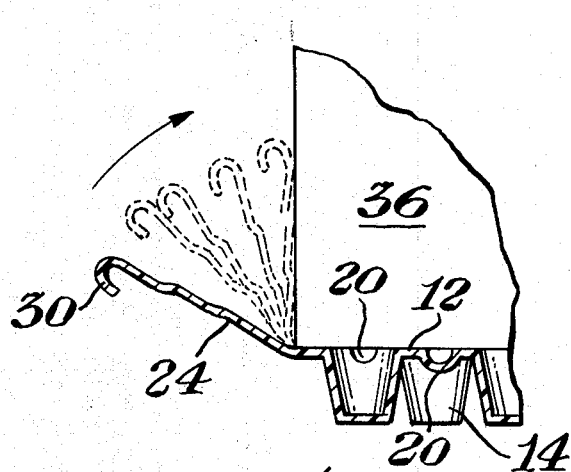
Figure 10:
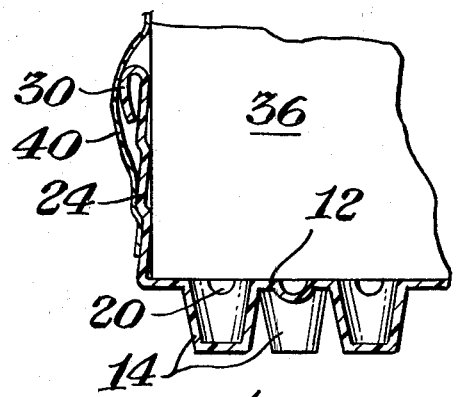

The lower base 32 of the sidewall is also considered a critical design parameter where the pallet is required to size itself to the product load, as is typically the case for unitized boxed loads. The design is also desirably featured in pallets for industrial bag loads although being less critical in this application. A radius R of between about ½″ to 1¼″ is specified for the self-sizeable pallet design. The case for an undersized load is illustrated in FIG. 8, wherein the amount of undersizing is represented by a spacing "U" of 1½ inches between the sidewall and load (considered an extreme discrepancy). Using the radius described, the pallet sidewall bends along the radius as shown in dotted lines, making intimate contact with the base of the product load. The case for an oversized product load is represented in FIG. 9. Here the load bears against the base of the sidewall, forcing it outwardly as shown. However, because the pallet is slightly oversized, by the described radius of the lower base thereof, the sidewall is readily retrieved into intimate contact with the sides of the load, as shown by the dotted lines, illustrating the sidewall in the retrieved position, as shown in FIG. 10.

In conjunction with the flexible and this self-sizing pallet design created by the structure, supra, the sidewall is further modified, as shown in FIG. 1 by removing the four corners of the sidewall, preferably in the form of "V"-shaped or equivalently tapered cutouts 34, as shown by dotted line illustration. Thus, the sidewall is converted to essentially independently moveable members, that are individually bendable inwardly to achieve the compact, intimate contact desired between the pallet sidewall and load.

Figure 7:
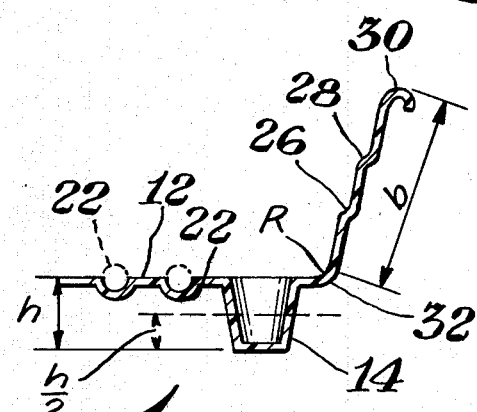

The taper of the sidewall is also desirably controlled to a value of between about 10° to 15° with the vertical (see FIG. 7). Particularly for the case of the FIG. 1 pallet design, and less critically for the sizeable pallet design of FIGS. 8–10, the taper, where provided, renders the pallet quite suitable to automatic product loading equipment, even that equipment as has been designed for intended use with conventional non-sided wooden or plastic pallet structures.

Pallets designed according to FIG. 1 and having the x and y dimensions of 40″ and 46″, respectively, sidewall height of 4″, and column height of 1½″, and prepared from 80 mil sheet, may be nested compactly for shipment of new pallets, or for return of used pallets. In the specific pallet design referred to, supra, pallets in nested form, each require a stacking height of only about ⅜″. Nesting points identified in such stacked pallets are the rolled edge 30, in conjunction with the ribs 20, 22. While reverse tapered, more conventional nesting detail may be added to this pallet design, jamming is not observed, hence, suggesting that such added features may frequently be avoided while retaining satisfactory nestability.

Figure 11:
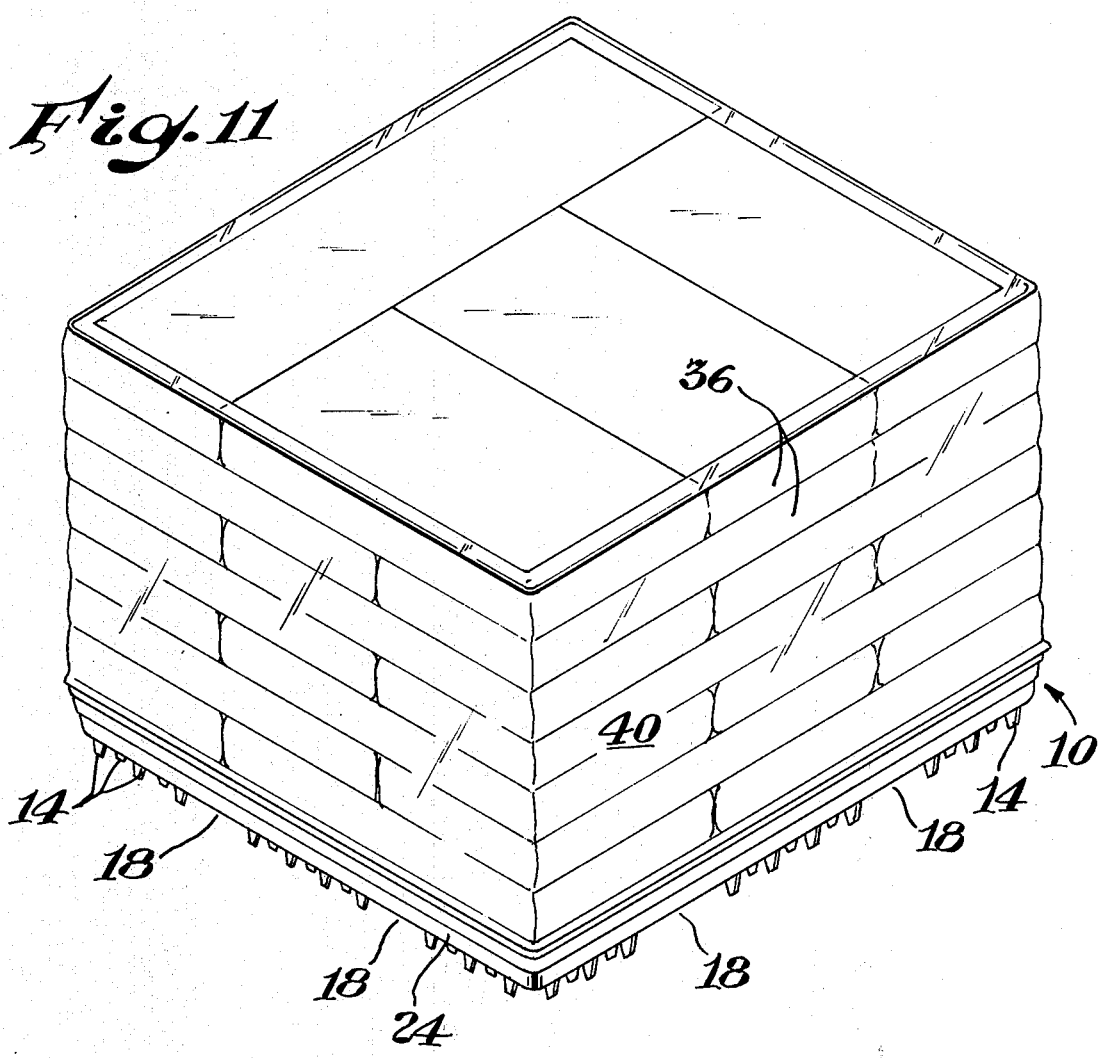
FIGS. 11 and 12 illustrate a loaded and unitized product load embodying as the base support therefor, the pallet shown in FIG. 1, except modified for a 4-way lifting fork entry, FIG. 12 being an enlarged partial view of the fork entry area of the pallet.
Figure 12:
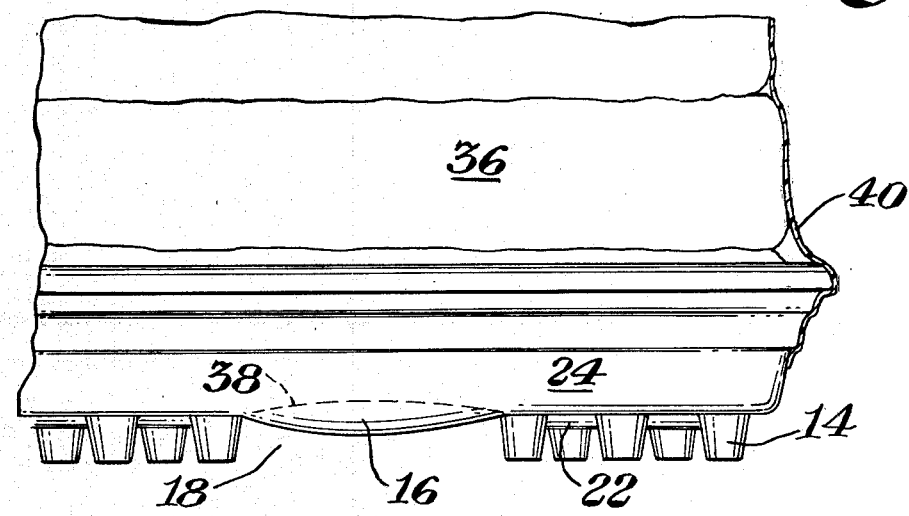

The use of pallets 10 in conjunction with a untized, individualized product load 36, stacked in a traditional interlocking pattern, is illustrated in FIG. 11 (the term "individualized" being used to describe a load of numerous articles as opposed to a single or few articles). Minimal or no observed sagging of the non-column supported spans is observed with respect to corrugated boxes, as an example. For the illustrated industrial size bags, normally meaning bags of about 25 or more pounds in weight, however, some sagging of the unsupported spans is observed. For example, using the specific pallet mentioned, supra, with a column height of 1½″, span width of 7″, column density about 14, average cross-section 1.7 square inches, and prepared from 80 mil sheet, and loaded with 2500 lbs. of 50 lb size industrial bags, the sagging observed, while more exaggerated, remains within quite acceptable limits, for this more difficult case. What has been surprisingly observed in the study of pallet 10, is the reverse deformation of span 16 after the initial lifting activity, as illustrated by dotted line 38 in FIG. 12. While peculiar to the case of bag loads, it is with this type product that the upward set 38 taken in the span areas is of most utility to the design principles of the invention.

In a stacked pallet arrangement, the pallets 10 may be alternately supported on conventional warehouse pallets. The pallets are preferably moved and stored in the warehouse using this mode of handling, and since the warehouse pallets are continually reused, little added expense is required. For shipments in trucks and boxcars, the warehouse pallets reamin behind, and the pallets of this invention are loaded and stacked, using conventional methods. A paper board, or plastic sheet may be used at the top of the pallet loads to avoid the succeeding pallet stacked atop the lower pallets from engaging the product directly.

To enable forklift handling, the load is unitized by a film or net overwrap or by banding, herein generically termed "wrap means", which unitizes the product load, and binds the product load to the pallet. Assuming a film stretch overwrap, the most preferred form, the film 40 is wound circumferentially generally several times about the product load, extending downwardly about the sidewall of the pallet. Rolled edge 30 together with the stepped geometry of the sidewall, effectively attaches the tightly wound stretch wrap to the pallet. Shrink wrap and netting (preferably inferring plastic netting material) may be applied in the same mode. The shrink wrap is customarily subjected to a post shrinkage step, to tighten it against the load and pallet.

The thusly prepared pallet load may be handled in the conventional manner by a forklift mechanism. The openings 18 at the underside of the pallet are positioned so that the forks apply a generally balanced lifting force. The lightweight pallets of the invention, particularly, have the capability for easy retrieval of the lifting fork after the pallet load is set down, because of the raised platform design that minimizes frictional interferences between the fork and underside of the pallet. Also the sidewall substantially avoids warpage and remains strongly attached to the film overwrap. For example, the 80 mil pallet described performs admirably with 2500 lbs of loaded industrial bags. The pallets may, in fact, be stacked two high, as conventional for boxcar shipments, and their functionality unimpaired. Since this pallet weighs only 6 pounds, the pallet load weight ratio is an extremely advantageous 416 plus, and where stacked, an effective 832 plus. Moreover, the compact pallet design, which is undersized compared to conventional wooden pallets, is ideally suited for convenient handling in the normally tight spacing load arrangements used to maximize the useable space of the boxcar. Also since the pallet referred to is an experimental design prepared by thermoforming under vacuum pressure using a wooden mold, very poor distribution of material in the more deeply drawn column area is achieved. Using more suitable aluminum faced molds, and maximized columnization of platform 12, comparable utility is expected for this application using 50 to 70 mil sheet.

Economics are such that typically pallets 10 may be used at considerably less than their optimum loading ratios. In generalized terms, therefore, 30 to 45 mil sheet thickness, per thousand pound, is usually suitable for bag loads, and a lesser 30–40 mils for box loads per thousand pounds. Hence, pallet 10 is characterized as suitable in purpose to perform admirably at superior pallet/load weight ratios of 300:1, it being understood that the pallet oftentimes may be subjected to even much greater loads.

Preferred plastics for constructing pallets according to this invention comprise thermoformable sheets of plastic most preferably of ethylene and propylene homopolymer or copolymers. More generally, any extrudable and thermoformable plastics, including those with binders and particularly inexpensive off grade, and recycled plastic scrap materials can be considered as a suitable substitute for preparing pallets 10, either alone, or if not entirely satisfactory alone, in admixture with other plastics. Fiber reinforcements such as glass fibers may also be incorporated in the sheet from which the pallet is prepared, for even added and quite inexpensively attained strength properties.

What is claimed is:

1. A lightweight pallet of from between about $2\frac{1}{4}$ to about 9 pounds in weight and having a raised load supporting platform, the pallet comprising:
    (a) a thin flexible sheet of heat-formable thermoplastic material, said flexible sheet comprising the load supporting platform of the pallet;
    (b) a rigid base in the vertical direction, the base supporting said flexible sheet in a normally disposed horizontal, raised position, and being characterized by sufficient rigidity to resist substantial compressive deformation under a compressive load, uniformly applied over the horizontal load supporting area of the flexible sheet, of 300 times the weight of the pallet;
    (c) the rigid base comprising hollow thin-walled ground engageable column means, said base comprising from between about 10 to about 40 column means for each square foot of the horizontal load supporting area of the flexible sheet; said column means being from between about $\frac{3}{4}$ to about 2 inches in depth and comprising depressions formed in the flexible sheet;
    (d) the flexible sheet comprising stiffening rib means integrally formed therein and further comprising a pair of non-ground supported, laterally spaced and parallel flexible sheet portions engageable at the underside with the tines of a lift fork;
    (e) said rigid base and flexible sheet being formed integrally of a heat formable sheet of thermoplastic of from between about 30 to about 120 mils average sheet thickness.

2. The pallet of claim 1 formed of a sheet of a heat formable thermoplastic of between about 30 to about 80 mils average sheet thickness.

3. The pallet of claim 2 wherein said sheet thickness is in a range between about 50 to about 80 mils, said pallet weighing about 6 pounds or less.

4. The pallet of claim 1 wherein the horizontal load supporting area of the pallet is generally rectangular, said flexible sheet terminating along each side of the pallet in a sidewall, the base of which defines a radius of curvature of between about $\frac{1}{2}$ inch to about $1\frac{1}{4}$ inch.

5. The pallet of claim 4 wherein the sidewall comprises independently flexible sidewall members along each side of the pallet.

6. The pallet of claim 1 wherein said rigid base comprises from between about 15 to about 25 column means per square foot of the horizontal load supporting area of the flexible sheet.

7. The pallet of claim 1 wherein said column means are arranged in a center faced hexagonal pattern.

8. The pallet of claim 1 which is generally rectangular in shape, said flexible sheet defining a second pair of nonground supported laterally spaced and parallel flexible sheet portions, arranged at a right angle with respect to said first pair, and which together provide fork tine entry along all sides of the pallet.

* * * * *